United States Patent Office 2,705,482
Patented Apr. 5, 1955

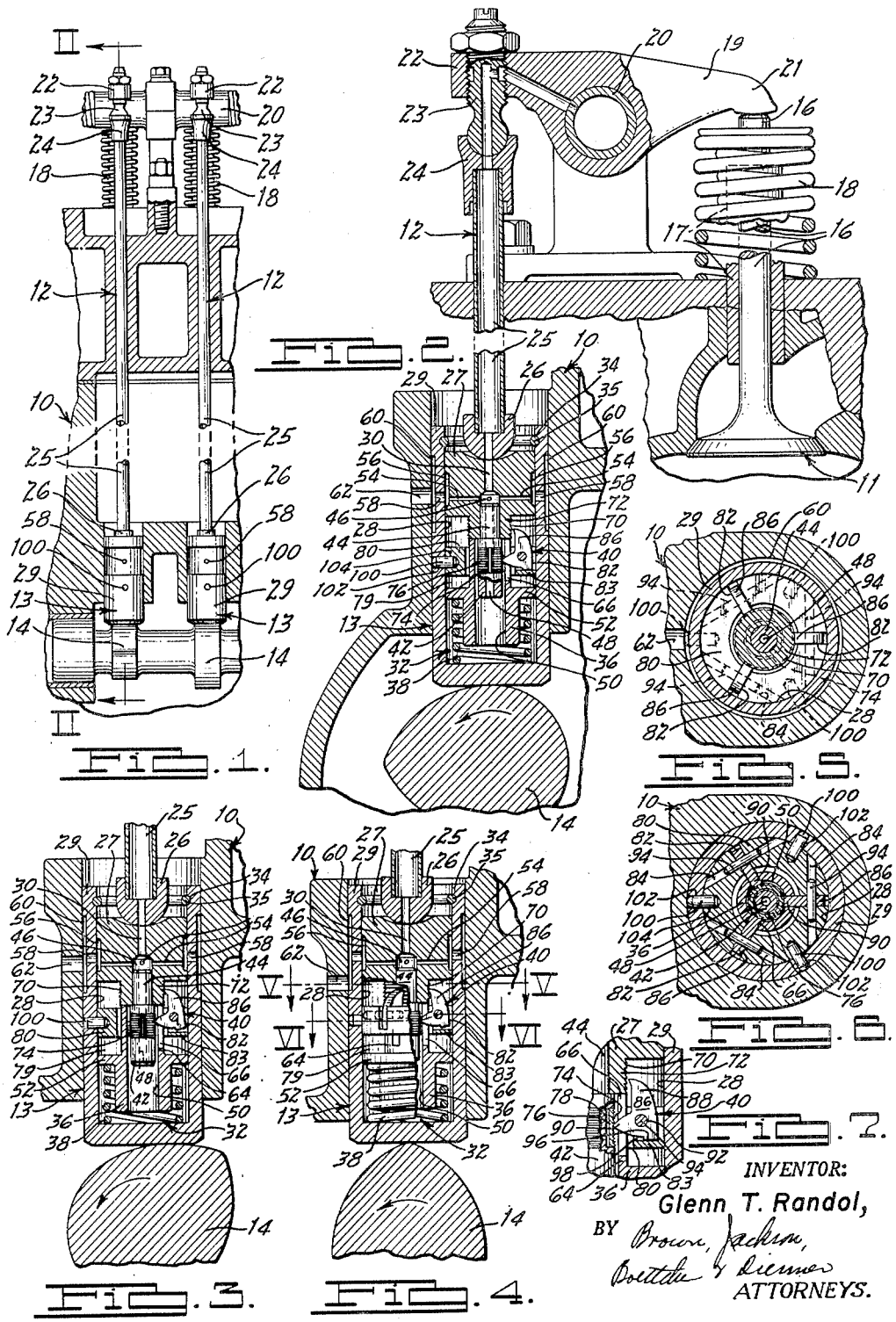

2,705,482

MECHANICAL SELF-ADJUSTING VALVE LIFTER

Glenn T. Randol, Mountain Lake Park, Md.

Application April 19, 1951, Serial No. 221,798

16 Claims. (Cl. 123—90)

The present invention relates to improvements in a mechanical self-adjusting valve lifter which is adapted to maintain substantially zero clearance external to an operating clearance in the valve drive train of an engine in which it is embodied. The invention further relates to an improved clutch mechanism of the pawl and ratchet type and the embodiment thereof in a mechanical valve lifter.

An object of the present invention is to provide an improved positive clutch mechanism of the ratchet and pawl type that is economical of manufacture, compact, readily assembled and disassembled, uniformly actuated into and out of engagement irrespective of the separated relationship of the members to be coupled, and effective to compensate for small increments of relative movement between the members to be coupled.

A further object is to incorporate the improved clutch mechanism in a mechanical valve lifter of improved construction particularly adapted for the improved clutch mechanism.

Valve lifters of the mechanical type presently used commercially do not provide for automatic adjustment of the valve drive train nor for automatic prevention or elimination of substantially all undesirable backlash in the valve operating mechanism of an internal-combustion engine. In mechanical drive trains, a limited clearance is desirable between the engine cam shaft and the stems of the valves to compensate for wear, and expansion and contraction due to temperature changes. As the engine is operated, such clearance is increased due to the impact and wear to which the valve drive parts are subjected. Increased clearance, for example, between the rocker arms and valve stems of overhead-valve engines results in inefficient and noisy operation of the engine and requires a partial disassembly of the engine to adjust the tappets, that is, to correct the clearance between the rocker arms and valve stems, in accordance with the operating characteristics of the particular engine, by effecting a manual adjustment in the drive train.

To avoid the necessity for frequent tappet adjustment and to eliminate noisy and inefficient operation of the engine, some commercial engines are equipped with hydraulic valve lifters which tend to effect automatic adjustment of the valve drive train to maintain substantially zero clearance between certain parts in the train, so that in effect, the drive train functions as a solid body in opening the valves of the engine. A major deficiency of commercial hydraulic valve lifters is that they are not effective for maintaining a desirable backlash in the valve operating mechanism of the engine.

It is an object of the present invention to provide a valve lifter mechanism of a character operable to maintain automatically substantially a given clearance in the valve drive train, in which it is embodied, under substantially all engine operating conditions and to eliminate substantially such backlash as may be present in the valve operating mechanism of the engine which would modulate the desired backlash.

In a preferred embodiment of the invention, a valve lifter mechanism is provided adapted to be arranged in the valve drive train between an engine valve and cam shaft comprising an outer body member or element mounted for sliding movement in the block of an engine, a pair of inner body members or elements mounted for sliding movement in and relative to the outer body member, and clutch means between one of the inner body members and the outer body member effective, upon engagement thereof, to establish an operating clearance in the valve drive train prior to opening of the engine valve thereby.

A further object of the invention is to provide relatively movable inner and outer body members or elements and a positive clutch therebetween, and in which the lifter mechanism includes means adapted, upon disengagement of the clutch, for accommodating shortening or lengthening adjustments as required, in small increments, between the movable elements or members to compensate for any under- or over-adjustment in the valve drive train without affecting the aforementioned operating clearance upon closing of the engine valve.

The above object is achieved in the preferred embodiment of the present invention, by providing spring means between the inner and outer body members or elements, which spring means function to bias normally the inner and outer body members away from each other and to disengage the clutch means upon closure of the engine valve, thus re-establishing the aforesaid operating clearance between the body members and to accommodate relative movement in either direction between the inner and outer body members thereby establishing and maintaining said operating clearance in the valve drive train until just immediately prior to reengagement of the clutch in the next succeeding valve opening operation.

A further object of the present invention resides in providing an oil chamber between the outer and inner body members, which, by way of example, may have connection with the lubricating oil pressure supply of the vehicle engine, to supplement or provide a dash-pot action for actuation of the clutch means in maintaining substantially said constant clearance in the valve operating train and further to effect substantially uniform movement of the inner and outer body members in opening the engine valve.

The above and other objects and advantages of the present invention will become apparent in the following detailed description of a preferred embodiment of the invention, wherein reference is made to the accompanying drawings, in which:

Figure 1 is a fragmentary vertical sectional view through an internal-combustion engine, showing in elevation a valve lifter mechanism constructed in accordance with the principles of the present invention.

Figure 2 is an enlarged vertical sectional view taken substantially along the line II—II of Figure 1, looking in the direction indicated by the arrows, and showing my valve lifter mechanism in engine valve closed position wherein the operating clearance is established;

Figure 3 is a detailed vertical sectional view of the valve lifter mechanism of Figures 1 and 2 with the parts thereof in locked-up substantially zero clearance condition just prior to opening of the engine valve;

Figure 4 is another vertical sectional view of the valve lifter mechanism of Figures 1 and 2, but showing the parts thereof in engine valve open position;

Figure 5 is a transverse sectional view taken substantially along the line V—V of Figure 4, looking in the direction indicated by the arrows;

Figure 6 is a transverse sectional view taken substantially along the line VI—VI of Figure 4, looking in the direction indicated by the arrows; and Figure 7 is a fragmentary sectional view on an enlarged scale illustrating the clutch means of the valve lifter mechanism of the present invention, with the clutch released or disconnected and the parts of the mechanism in engine valve closed position, as in Figure 2.

Referring now to the drawings, and particularly, to Figures 1 and 2, I have shown a preferred embodiment of my invention incorporated with a conventional internal-combustion engine 10 having a plurality of valves, one of which is shown at 11 in Figure 2. A valve drive train indicated generally at 12 is provided, as is well understood in the art, for each valve of the engine, and the valve drive train is conventional in all respects except for the valve lifter mechanism 13 of the present invention, which is embodied therein. The valve drive train 12, as shown, extends between the valve 11 and the cam shaft 14 of the engine. The valve 11 may be of any known construction and the valve selected for illustration includes a stem portion 16, guided in a collar part 17, and having preloaded spring means 18 associated therewith for normally tending to close the valve. A rocker arm 19, pivotally mounted intermediate its ends on an oil distributing pipe 20, is adapted to bear at one end 21 thereof against the free end of stem 16 when rotated in a clockwise direction as viewed in Figure 2 of the drawings, to open valve 11 against the force of the spring means 18. The other end 22 of the rocker arm 19 has a fitting 23 secured therein, and with which is associated a connector member 24 having one end of a hollow push rod 25 secured thereto. Referring to Figure 2, the other end of the push rod 25 has a connector 26 secured thereto, which bears against the dished upper end portion of an inner body member 27, which is mounted, in the embodiment of the present invention herein disclosed, for vertical sliding movement in a bore 28 of an outer body part 29. The inner body part 27 and the outer body part 29 as will presently appear, form a part of the lifter mechanism 13 of the present invention. The end portion 22 of the rocker arm 19, fitting 23, connector 24 and member 26 are provided with suitable bores, and, together with the hollow rod 25 conduct oil under pressure from the pipe 20 of the lubricating system of the engine to a bore 30, formed centrally of the inner body part 27, and thence to a chamber, indicated generally at 32, in the lower end of the bore 28 in the outer body member 29. The function and purpose of the chamber 32 will be referred to in greater detail hereinafter.

The lifter mechanism 13 of the present invention comprises the outer body part 29, the inner body part 27 mounted for rectilinear sliding movement and free rotational movement in the bore 28 of the outer body part 29, a second inner body part or member 36, preloaded spring means 38 confined between the second inner body part 36 and the outer body part 29, a clutch mechanism indicated generally by the numeral 40 and a central pin 42 associated with or forming a part of the first inner body member 27. The outer body part 29, adjacent the upper end thereof, is formed with an annular groove 34 for receiving a split snap ring 35 which serves to retain the inner and outer body parts in assembled relation when the valve lifter mechanism 13 is removed from the block of the engine.

Referring again to the various bores and passageways establishing communication between the engine lubricating system and the chamber 32, it will be seen that the central pin 42 is provided with a reduced end 44 adapted to be secured in, such as by a press fit, an enlarged continuation or counterbore 46 of the bore 30 in the first inner body member 27 to form a liquid reservoir. The central pin 42 is provided with an axial bore 48 aligned with the bore 30 in the body member 27. A second inner body member 36 is provided with an enlarged axial bore 50 within which the pin 42 freely fits and through which communication is established between the engine lubricating system and the chamber 32. The second inner body member 36 is provided with an integral flange 52, which together with the closed end of the bore 28 in the outer body member 29, defines the chamber 32. During operation of the engine, lubricant is forced under pressure to the chamber 32, so that same will serve as a dash-pot. Continuous circulation of lubricant through the lifter mechanism is provided for by a plurality of small radial passages 54 formed in the first inner body member 27, which bores or passages communicate with the liquid reservoir in the inner body member 27. Since the bores 54 are small in size, they form restricted passages for the flow of lubricant, which accommodate a slight continuous flow, but not such flow as would relieve the lubricant pressure in the chamber 32 to the extent that the dash-pot action becomes impaired. The radial passages 54 communicate at their outer ends with a circumferential groove 56 in the outer surface of the inner body member 27. A plurality of bores 58 extending through the wall of the outer body member 29 establish communication between the circumferential groove 56 and a circumferential groove 60 in the outer surface of the outer body member 29, which groove 60 communicates with a return passage 62 which leads to the engine oil sump.

Referring now to Figure 3, the inner body member 36 has a tubular portion 64 extending upwardly from the flange 52 for normally contacting the lower surface of the inner body member 27 under the urge of the spring means 38. Within the tubular portion 64 a plurality of circumferentially spaced slots 66 are formed. As many slots as desired may be formed, but in the preferred embodiment disclosed, three slots are utilized.

The clutch mechanism 40 includes two ratchet surfaces, the first 70 being in the form of closely generated parallel spaced shoulders interconnected by angularly disposed lands on the external surface of a reduced extension 72 of the first inner body member 27, and the second 74 in the form of fine parallel serrations on the surface of a split resilient sleeve 76 which is mounted on the pin 42 in a circumferential groove 78 provided therein, the sleeve 76 being confined between the shoulders of the groove 78 (Figure 7). The split-sleeve 76 is freely flexible to expand and contract radially as operation of the mechanism requires. The surface of the sleeve 76 is exposed by the slots 66 in the upper tubular portion 64 of the second inner body member 36.

The lower surface of the inner body member 27, the extension 72, the tubular portion 64 and the flange 52 of the inner body member 36 and the bore 28 in the outer body member 29 define an annular chamber 79 within which a metallic ring 80 is positioned. The ring 80 is provided with a plurality of circumferentially spaced slots 82 of any desired number, the number of slots 82 coinciding with the number of slots 66 in the tube 64, which in the preferred embodiment, are three in number. The slots 82 are so formed in the ring 80 as to leave a base portion 83 of the ring 80. Bores 84 (Figure 6) forming chords of the circle defined by the outer circumference of the ring 80 are provided in the ring 80 and extend normal to and intersect the slots 82.

Positioned within each of the slots 82 is a pawl 86 comprising two arms extending at substantially right angles, one being an elongate arm 88 extending generally vertically and being adapted to intermittently cooperate with ratchet surface 70, the shoulders of which are spaced, for example, approximately .005 to .008 inch apart, to provide the aforesaid operating clearance between the engaging end of the arm 88 of the pawls 86 whereby relative movement of the outer body member 29 to the inner body member 27 is accommodated for pawl actuation into and out of engagement with the ratchet shoulders as will hereinafter be clearly demonstrated, and the other being a short arm 90 extending generally horizontally and being adapted to cooperate with the ratchet surface 74 (Figure 7). A hole 92 is provided in each of the pawls 86 and is arranged to align with the corresponding bore 84. A pin 94 is positioned within each bore 84 and extends through the hole 92 in each of the pawls 86 to pivotally mount the pawls 86 on the ring 80. Each pawl 86 is provided with a base stop portion 96 to engage with the base portion 83 of the ring 80 to define the limit of movement of the pawls in one direction; namely, in a clockwise direction as viewed in Figure 7 of the drawings. Each pawl 86 is under-cut as at 98 to provide for the free pivotal movement of the pawl with respect to the base portion 83.

The ring 80 is secured to the outer body member 29, as best seen in Figure 6, by means of a plurality of pins 100 extending through holes 102 in the walls of the outer body member 29 and into bores 104 in the ring 80, which bores are circumferentially spaced alternately of the slots 82 for the pawls 86.

The clutch mechanism 40 is assembled by inserting the pawls 86 into the slots 82 and passing the pins 94 into the bores 84 and through the holes 92 in the pawls 86. The valve lifter mechanism 13 is assembled as follows:

The spring means 38 is inserted in the bore 28 of the outer body member 29, then the second inner body member 36 is inserted in the bore 28 of the outer body member 29 so that the lower tubular portion 64 of the body member 36 is positioned within the spring means 38, which is in the form of a helically coiled spring, with the flange 52 of the body member 36 engaging the top of the spring 38, then the pawl and ring assembly is inserted within the bore 28 of outer body member 29 and positioned therein so that the bores 104 in the ring coincide with the holes 102 in the wall of the outer body member 29, the pins 100 are then passed through the holes 102 into the bores 104 to secure the ring with respect to the outer body member 29, the pin 42 is formed separately and is pressed into the enlarged bore 46 in the inner body member 27, the split-sleeve 76 is then slipped over the end of the pin 42 and is slid into position within the circumferential groove 78 in the pin 42, then the inner body member 27 which has previously been provided with the bores therein and with the reduced extension having the generated grooves forming the ratchet 70, is inserted in the bore 28 of the outer body member 29, and thereafter the snap ring 35 is inserted into the groove 34 in the inner surface of the outer body member 29.

It will be noted from the foregoing paragraph, that the assembly of the lifter mechanism is very simple and convenient and can be speedily accomplished. In addition, the individual parts or elements of the assembly are easily and economically made. The operation of the lifter mechanism will be described in detail hereinafter, from which description it will be immediately noted that the mechanism may be utilized for purposes other than a valve lifter. In particular, the mechanism is adapted to serve as a clutch. When utilized as a clutch in various installations, certain elements of the mechanism may be omitted without affecting operation of the mechanism as a clutch. For example, the dash-pot arrangement may be omitted. The second inner body member may also be omitted, provided that some modified arrangement be made so that the first inner body member and the outer body member are biased with respect to each other for relative movement.

One particular feature of the present invention is the provision of the two ratchet surfaces 70 and 74 for assuring accurate and immediate adjustment of the various elements of the mechanism to compensate for over-adjustment or under-adjustment and to maintain substantially said operating clearance in the valve drive train. The arrangement of the two ratchet surfaces and their cooperation with the pawls assures that the pawls will be moved in a never changing arc upon each actuation thereof. In other words, the movement of the pawls, and of each of the pawls, is uniform upon each actuation thereof. This uniformity of movement of the pawls is accomplished by providing the split-sleeve 76 for effecting actuation of the pawls. The serrations formed on the surface of the split-sleeve 76 are very fine so that upon relative movement of the pawls and the sleeve, the pawls are immediately actuated by the sleeve. The ratchet surface 70 provided by the closely generated grooves on the surface of the reduced extension of the the inner body member 27, is particularly formed to provide a saw-tooth arrangement so that the lower surface of each tooth or shoulder formed by the grooves or angular interconnecting lands, is substantially horizontal and the upper surface of each tooth is inclined. The grooves are closely generated on the surface of the reduced extension so that the distance between adjacent horizontal surfaces of the teeth is small to insure the desired operating clearance in the valve drive train. Said clearance enabling the pawls 86 to be actuated into and out of engagement with the shoulders of the ratchet surface 70. The extent of such operating clearance establishable between the pawl arms 88 and spaced shoulders, being defined by the spacing of the shoulders which, for example, may be set at approximately .005 to .008 inch apart as required by the particular engine. The serrations on the sleeve 76 may be of any form, but are preferably of circular parallel outline and spaced much closer than the grooves of the ratchet surface 70.

The operation of the valve lifter mechanism 13 of the present invention is as follows:

With the engine valve in closed position, the various elements of the mechanism will assume the relative positions shown in Figure 2, in which the spring 38 between the second inner body member 36 and the outer body member 29 biases the flat bottom end of the outer body part 29 into engagement with the base circle portion of the cam 14 and normally biases the inner and outer body parts away from each other but is capable of accommodating relative movement in either direction between the body parts to establish the operating clearance within the valve lifter unit 13 as defined by the space obtaining between the engaging end of the pawl arms 88 and the ratchet shoulder 70 engageable thereby. The pawls are in engagement through their horizontal arms 90 with the resilient sleeve 76.

As the cam shaft rotates in a counterclockwise direction, as indicated by the arrow, to the position shown in Figure 3, the outer body part 29 is acted upon by the cam forcing it upwardly, and such upward thrust of the outer body member, in turn, acts directly on the pawls 86. By virtue of the vertical movement of the outer body member 29 to which the pawls are secured and the inertia of the inner body member 27 to which the serrated sleeve 76 is secured, the horizontal arms 90 of the pawls are cammed by the serrations of the ratchet surface 74 upon such tendency for relative movement as accommodated by the aforesaid operating clearance within the clutch mechanism 40, to pivot the pawls about the pins 94 to bring the vertical arms 88 into engagement with the adjusted ratchet surface 70 on the inner body member 27. As the pawls 86 are pivoted into engagement with the ratchet surface 70, the pawl arms 88 engage the horizontal under-surfaces of one of the teeth formed by the annular generated grooves of the ratchet surface 70 to lock the outer body member 29 and the first inner body member 27 together for uniform vertical movement upon said operating clearance being fully taken up prior to the lifter unit 13 opening the selected engine valve.

The conjoint movement of the outer and inner body members together, results in the actuation of the valve drive train to open the selected valve 11 of the engine. Upon further rotation of the cam 14 in a counterclockwise direction from the position shown in Figure 4 to the position shown in Figure 2 wherein the engine valve is closed with consequent relaxation of the load imposed by the spring 18 on the lifter unit 13 during valve opening, the outer body member 29 will assume a relatively relaxed condition, but will commence a relative downward movement with respect to the inner body members, thus causing disengagement of the pawl arms 88 and the ratchet surface 70. At this time, the body members will be free to move in either direction with respect to each other to compensate for expansion or contraction of the valve drive train. Expansion in the valve drive train, such as that occurring as the engine warms up, is usually relatively slight and is compensated for, by the mechanism of the present invention, by relative movement of the body members toward one another to shorten the valve drive train and avoid over-adjustment thereof, which movement is readily accommodated by the spring 38 and the fluid in the chamber 32. Contraction of the valve drive train, such as caused by wear of the elements in the train, resulting in establishment of clearance or backlash is readily compensated for in the following manner. As the cam lobe passes over center, the spring 38 is enabled to thus bias the outer body member 29 and the second inner body member 36 relatively apart, to reestablish limited relative movement therebetween, the second body member 36 acting on the first inner body member 27 through the stem or upper tubular portion 64 thereof, serving to take up any backlash in the valve drive train and to re-establish said operating clearance in the valve drive train. This is achieved by the spring 38 acting on the outer body member 29 to effect downward movement thereof, the inner body members 27 and 36 remaining relatively stationary, so that the pawls 86 are tilted out of engagement with the ratchet surface 70 by the camming action of the ratchet surface 74 acting on the horizontal arms 90 and of the inclined upper surfaces of the teeth of the ratchet 70 acting on the vertical arms 88 of the pawls in re-establishing the operating clearance therebetween. The short horizontal arms 90 of the pawls 86 being in constant engagement with the resilient sleeve 76 normally act to cause, but on occasion act only to supplement, the aforesaid pawl disengaging operation, and should any backlash or clearance adjustment have to be made, the resilient sleeve 76 will be slightly compressed radially following disengagement of the pawls 86, to accommodate ratcheting of the serrations thereof over the extremities of the horizontal arms 90 according to the required adjustment of the lifter members. The limit stop defined by the base portion 83 of the ring 80 and the base portion 96 of the pawls 86 limits movement of the pawls in the direction to disengage pawls 86 from the grooved surface 70, so that the sleeve 76 is forced to ratchet with respect to the arms 90 when relative axial movement of the body members in eliminating backlash is greater than a predetermined maximum; i. e. the movement required to disengage the pawls 86 after closure of the engine valve is effective to remove the load of the spring 18 from the engaged pawls 86 thus enabling disengagement thereof so that the two body members 27, 29 may adjust relatively according to wear and/or thermal conditions. Since the serrations are very fine, any minute adjustments may be made. This latter movement is effected while the lower surface of the outer body member 29 is engaged with the trailing edge of the eccentric portion of the cam 14 so that the parts and elements of the mechanism will again return to the position shown in Figure 2 wherein the cam has rotated to the extent necessary to bring the base circle portion thereof into engagement with the undersurface of the outer body member 29. During operation of the mechanism, the upper inner body member is free to rotate so that different areas of the ratchet surfaces will be engaged by the pawls to avoid concentrated wear on these surfaces.

It will be observed that in the operation of the valve lifter mechanism of the present invention, the chamber 32 between the inner end or flange 52 of the second inner body member 36 and the closed lower end of the outer body member 29, is constantly filled with lubricant of limited pressure due to its connection with the pressure lubrication system of the engine, as previously described. The oil thus delivered to the chamber 32 will act to retard relative movement between the inner and outer body members in effecting engagement of the clutch by virtue of the pivotal movement of the pawls. Thus, the pressure of the oil in the chamber 32 supplements the lock-up action of the clutch means to control or maintain substantially said operating clearance in the valve operating train. The oil pressure chamber 32 thus provides a dash-pot effect, which initially resists slight relative movement of the inner and outer body members, with respect to each other to minutely shorten the valve drive train. It will be observed that the oil pressure in the chamber is also effective to assist the spring 38 in establishing said operating clearance in the valve train.

From the foregoing description, it will appear that the split-sleeve 76 is adapted to uniformly actuate the pawls 86 through a predetermined degree of pivotal movement regardless of the relative axial relation established between the inner and outer body members. Were it not for the provision of the split-sleeve 76, the pawls 86 would not be actuated uniformly into and out of engagement with the grooves of the ratchet surface 70. If this feature were not incorporated in the invention, the greater the separation of the inner and outer body members, the greater the pivotal stroke required of the pawls. As the separation of the inner and outer body members increases, the necessary pivotal stroke of the pawls would correspondingly increase to an undesirable and impractical degree. As will also be noted from the foregoing description, the present invention provides a step-by-step backlash adjustment, which steps are defined by the spacing of the grooves of the ratchet surface 70 engaged by the ends of the vertical arms 88 of the pawls 86. As a practical basis of adjustment, it has been found that the grooves should be preferably spaced approximately .005 to .008 inch apart. Finer or coarser graduations can be incorporated, of course, as the operating characteristics of the particular engine require. Due to this spacing, a small, unobjectionable amount of clearance, much smaller than that normally occurring in commercial mechanical and hydraulic lifters, will be reinstated upon each actuation of the mechanism, which clearance partially accommodates relative adjustment of the body members toward one another when compensating for expansion of the valve drive train.

In operation, the inner body members 27 and 36 act substantially as a unitary assembly due to the spring urged engagement between the tubular portion 64 of the lower member and the extension 72 of the upper member. It is clear, therefore, that a unitary member could be used instead of the dual construction, if the pawl carrying ring 80 was made in two or more pieces for assembly around a tubular portion of the inner body member corresponding to the pin 42. Such assembly would not be as advantageous as the preferred form shown and described herein. Likewise, the assembly consisting of the pin 42 and body member 27 could be made in a unitary manner and the location and type of the ratchet surfaces could be varied. Such variations and modifications are to be included within the scope of the present invention.

In the present novel lifter mechanism, the aforesaid adjustments are accommodated by the "operating clearance" hereinbefore described which enables a predetermined relative movement between the outer member 29 and the inner members 27, 36 whereby the disengaged relationship of the pawls to the ratchet shoulders 70 results when the lifter unit 13 engages the closing ramp of the engine cam 14 and then onto the base circle thereof. Requisite to the operation of the present valve lifter mechanism is the aforesaid limited relative movement provided between the outer body member 29 and the inner body members 27, 36 to actuate the pawls 86 upon initial engagement of the outer member 29 by the engine cam 14, to lock the said members together for in unison movement to effect a cyclical opening and closing actuation of the engine valve thereby. The aforesaid operating clearance obtaining between the outer and inner body members accommodates such limited relative movement of the outer member 29 to actuate the pawls into engaged relation with a shoulder of the ratchet surface 70, and upon said clearance being fully taken up the body members move upwardly together in locked relation to open the selected engine valve. During closing of the engine valve, the lifter unit 13 comes in contact with the closing ramp of the cam 14 and then onto the base circle thereof which enables the valve spring 18 to close the engine valve 11 thereby relieving lifter unit 13 of the valve spring load so that the spring 38 may disengage the pawls 86 and adjust the lifter body members relatively to eliminate any undesirable backlash in the valve drive train and reestablish the said operating clearance for the next valve opening cycle.

While I have shown and described what I consider to be a preferred embodiment of my invention, it will be understood that various modifications and rearrangements may be made therein without departing from the spirit and scope of the invention.

I claim as my invention:

1. A valve lifter mechanism comprising relatively movable body members, and one-way clutch means operably incorporated between said body members adapted to be engaged responsive to relative movement of said members in one direction thereof with respect to each other, and adapted to be disengaged responsive to relative movement of said members in the other direction thereof with respect to each other, said clutch means including a plurality of clutch elements having a fixed pivotal axis carried by one of said body members and movable to engage cooperating elements carried by the other body member, preloaded spring means for elongating said body members relatively to each other, and means for effecting uniform pivotal movement of said clutch elements upon each actuation of said members in said one direction thereof.

2. A valve lifter mechanism comprising an outer body member having a bore therein, a pair of inner body members mounted for sliding movement in the bore of said outer body member, preloaded spring means for elongating said outer and inner body members relatively to each other, and clutch means operably positioned between the two inner body members, and operative between one inner body member and said outer body member to normally lock said one inner body member to said outer body member upon relative movement of said members in one direction with respect to each other and to accommodate relative movement between said members upon relative movement of said members in the other direction with respect to each other.

3. A valve lifter mechanism comprising an outer body member having a bore therein, an inner body member mounted for sliding movement in the bore of said outer body member, preloaded spring means for elongating said outer and inner body members relatively to each other, and clutch means comprising movable clutch element means operably incorporated between said body members, said clutch element means being connected to one of said members for movement therewith and the other member presenting a clutch surface and a cam surface for engagement by portions of said clutch element means, whereby said clutch element means upon relative movement of said body members in one direction with respect to each other is adapted to be moved due to its engagement with said cam surface into engagement with said clutch surface to clutch said body members together, and upon relative movement of said body members in the other direction with respect to each other, said clutch element means is moved due to its engagement with said cam surface to disengage said clutch element means from clutching engagement with said body members.

4. A valve lifter mechanism for use in a valve drive train for opening and closing the valve of an engine, comprising body means defined by an outer body member having a bore therein and a pair of inner body members mounted for sliding movement in the bore of said outer body member, said body means being adapted to be disposed in said valve drive train, spring means between one of said inner body members and said outer body member normally biasing said members away from each other and accommodating relative movement of said members towards each other to establish substantially zero clearance in the valve drive train in the closed position of the engine valve, one-way clutch means operably incorporated between the other of said inner body members and said outer body member normally operable upon movement of said outer body member in a direction to move said outer body member toward said inner body members to clutch said outer body member and said other inner body member together for conjoint movement and opening of said engine valve, and cam means for engaging said outer body member to effect movement of said body members in said direction with respect to each other and the normal operation of said clutch means.

5. A valve lifter mechanism for use in a valve drive train for opening and closing the valve of an engine, said valve drive train having fluid passageway means therein for connection with a source of fluid under pressure, comprising body means including an outer body member having a bore therein and a pair of relatively movable inner body members mounted for sliding movement in the bore of said outer body member, spring means between said outer body member and one of said inner body members normally biasing them away from each other and accommodating relative movement of said body members toward each other to establish substantially zero clearance in the valve drive train in the closed position of said valve, one-way clutch means normally clutching said outer body member to the other of said inner body members upon relative movement of said outer body member and said inner body members toward each other, a cam means for engaging said body means to effect movement of said body members toward each other to effect normal engagement of said clutch means and opening of said engine valve, chamber means between the inner end of said one inner body member and the adjacent end of said outer body member, and fluid passageway means for said body means connecting said chamber means with the fluid passageway means of said valve drive train.

6. A valve lifter mechanism for use in a valve drive train for opening and closing the valve of an engine, the valve drive train having fluid passageway means therein for connection with a source of fluid under pressure, comprising an outer body member having a bore therein, a pair of inner body members mounted for sliding movement in the bore of said outer body member, spring means between the inner end of one of said inner body members and the adjacent end of said outer body member normally biasing said inner body members away from said outer body member and accommodating relative movement of said body members toward each other to establish substantially zero clearance in the valve drive train in the closed position of the valve, said inner body members having juxtaposed reduced extensions whereby a chamber is defined between said outer body member, said inner body members and said reduced extensions, a ring positioned within said chamber and secured to said outer body member, pawl means pivotally mounted on said ring, the extension on the other one of said inner body members presenting a pair of ratchet surfaces, said pawl means including a pair of arms arranged for engagement with said ratchet surfaces, movement of said outer body member in one direction normally effecting pivotal movement of said pawl due to engagement of one arm thereof with one of said ratchet surfaces to bring the other arm of said pawl means into engagement with the other of said ratchet surfaces to clutch said outer body member to said other inner body member for conjoint movement in opening of said engine valve, cam means for engaging said outer body member to effect movement thereof in said one direction and the normal pivotal movement of said pawl means, said spring means effecting movement of said outer body member in the opposite direction to effect reverse pivotal movement of said pawl means due to the engagement of said one arm with said one ratchet surface to disengage said other arm from said other ratchet surface, said one ratchet surface being capable of ratcheting with respect to said one arm of said pawl means to accommodate relative movement between said outer body member and said inner body members to maintain substantially zero clearance in the valve drive train in the closed position of the valve, chamber means between the inner end of said one inner body member and the adjacent end of said outer body member, and fluid passageway means in said body members connecting said chamber means with the fluid passageway means of the valve drive train.

7. A valve lifter mechanism as set forth in claim 6, including stop means defined by said ring and said pawl means for limiting reverse pivotal movement of said pawl means, whereby movement of said pawl means is always uniform.

8. A valve lifter mechanism for use in a valve drive train for a valve of an engine, comprising a pair of body members movable relatively with respect to each other to establish substantially zero clearance in the valve drive train, preloaded spring means for elongating said body members relatively to each other, a pawl pivotally mounted on one of said members, the other of said members presenting spaced ratchet surfaces, said pawl including a pair of arms adapted to engage said ratchet surfaces, movement of one of said members in one direction effecting pivotal movement of said pawl due to the engagement of one arm thereof with one of said ratchet surfaces to bring the other arm of said pawl into engagement with the other ratchet surface to clutch said body members together for conjoint movement.

9. A valve lifter mechanism comprising relatively movable body members, preloaded spring means for elongating said body members relatively to each other, a pawl pivotally mounted on one of said members, the other of said members presenting spaced ratchet surfaces, said pawl including a pair of arms, one arm of said pawl being adapted alternately to engage one of said ratchet surfaces, movement of one of said members in one direction effecting pivotal movement of said pawl due to the engagement of the other arm of said pawl with the other ratchet surface to bring said one arm of said pawl into engagement with said one ratchet surface to clutch said members together for conjoint movement, movement of said one of said members in the opposite direction effecting reverse pivotal movement of said pawl due to the engagement of said other arm of said pawl with the said other ratchet surface to disengage said one arm of said pawl from said one ratchet surface, whereby pivotal movement of said pawl is always uniform.

10. A valve lifter mechanism comprising an outer body member having a bore therein, a pair of inner body members mounted for sliding movement in the bore of said outer body member, preloaded spring means operably disposed between the outer body member and the inner body members for axially displacing said members apart, a pawl pivotally mounted on said outer body member, one of said inner body members presenting spaced ratchet surfaces, said pawl including a pair of arms adapted to engage said ratchet surfaces, movement of said outer body member in one direction effecting pivotal movement of said pawl due to the engagement of one arm thereof with one of said ratchet surfaces to bring the other arm of said pawl into engagement with the other ratchet surface, movement of said outer body member in the opposite direction effecting reverse pivotal movement of said pawl due to the engagement of said one arm of said pawl with said one ratchet surface to disengage said other arm of said pawl from said other ratchet surface, said one of said ratchet surfaces being capable of ratcheting with respect to said one arm of said pawl when movement in said opposite direction is greater than a predetermined maximum, whereby pivotal movement of said pawl is always uniform, said ratchet surfaces and said pawl being adapted to accommodate relative movement between said body members in either direction.

11. A valve lifter mechanism for use in a valve drive train for a valve of an engine; comprising a pair of body members movable relatively with respect to each other to establish substantially zero clearance in the valve drive train; spring means for biasing said body members apart and accommodating relative movement toward each other; ratchet serrations carried by one of said body members; a pawl pivotally mounted on the other of said body members and including a pair of arms one of which, continuously engages said ratchet serrations for operating the other arm into engagement with said ratchet serrations to thereby clutch said body members together for conjoint movement in one direction responsive to relative movement of said body members within a predetermined maximum.

12. In a valve lifter mechanism for operating the valve drive train to open and close an engine valve: an outer body member having a longitudinal cylindrical bore closed at one end and open at the other; an inner body member reciprocable in said bore and providing a liquid reservoir; a source of liquid pressure; spring means for axially elongating said body members relatively to each other; a liquid chamber formed between the closed end of said outer member and the adjacent end of the inner member; ratchet serrations carried on one of said body members; a pawl pivotally mounted on the other of said body members, said pawl comprising a pair of arms one of which, continuously engages said ratchet serrations for operating the other arm into engagement with said ratchet serrations to thereby clutch said body members together for conjoint movement in one direction responsive to relative movement within a predetermined maximum between said body members accommodated by the existent spaced relation between the other pawl arm and serrations when the engine valve is closed; and passageway means having a restricted portion for controlling the flow of liquid between said liquid reservoir and chamber to produce a dash-pot action in cooperation with said spring means to enable the relative movement of said body members aforesaid to effect the clutching operation of said pawl in the manner described during the lift portion of the lifter cycle to open the engine valve.

13. A valve lifter mechanism according to claim 12 wherein said source of liquid pressure is sufficient to effectively supplement the action of said spring means.

14. A mechanical compensating valve lifter for use in a valve drive train of an internal-combustion engine having a valve, comprising: an outer reciprocable member having a longitudinal cylindrical bore open at one end and closed at the other; a plunger assembly reciprocably mounted in said longitudinal bore; preloaded spring means effective between the outer member and plunger assembly for lengthening and accommodating shortening of the same relatively to each other; one-way clutch means having a plurality of elements pivotally disposed on fixed axes between the outer member and plunger assembly and movable for controlling limited relative movement therebetween in one direction, said elements having an actuating portion and a clutching portion, whereby said member and plunger assembly are clutched together for conjoint movement to open and close the engine valve responsive to reciprocation of the outer member; means operable for maintaining substantially uniform movement of said pivotal clutch elements irrespective of the relative disposition of said member and plunger assembly; and engine actuated means for imparting reciprocable movement to said outer member.

15. A compensating valve lifter according to claim 14, in which the plunger assembly comprises: a cylindrical element having a reduced extension, slidably fitted into the longitudinal bore of the outer member; a hollow cylindrical element coaxially disposed with respect to said slidable element with its confronting end constantly engaging the end of said reduced extension for movement together; and external annular flange medially disposed between the ends of the hollow element and adapted to provide a seat for one end of said spring means; a plurality of circumferentially spaced longitudinal openings in the wall of the hollow element through which project the actuating portions of said pivotal clutch elements; and a plurality of longitudinally spaced circular clutching shoulders in the external surface of said reduced extension on said slidable element, for intermittingly cooperating with said clutching portions on said pivotal clutch elements to clutch the outer member and plunger assembly aforesaid together for the purpose.

16. A compensating valve lifter according to claim 14, in which said maintaining means comprises: a depending stem member carried by the slidable element of said plunger assembly, and adapted to project from the reduced extension thereof into the hollow of the coaxially disposed element; an external annular groove on said stem member; a split radially resilient sleeve disposed in said groove for axial movement with said stem member; and a series of longitudinally disposed closely generated circular serrations in the external surface of said split sleeve for constantly cooperating with the actuating portions aforesaid on said pivotal clutch elements, to move the clutching portions thereof into clutching engagement with said circular shoulders, whereby the outer member and plunger assembly are clutched together for conjoint movement to open and close the engine valve responsive to relative movement aforesaid of the outer member with respect to the plunger assembly, and for accommodating relative adjustment of said pivotal clutch elements and split sleeve to maintain substantially uniform movement aforesaid of said clutch elements at different relatively adjusted positions of the outer member and plunger assembly prior to valve opening cycles in the manner set forth.

References Cited in the file of this patent

UNITED STATES PATENTS

| Re. 21,802 | Russell | May 13, 1941 |
| 1,859,600 | Prettyman | May 24, 1932 |
| 2,143,121 | Cox | Jan. 10, 1939 |
| 2,326,780 | Howard, Jr. | Aug. 17, 1943 |